(12) United States Patent
Mohr et al.

(10) Patent No.: US 11,038,971 B2
(45) Date of Patent: Jun. 15, 2021

(54) DISPLAYING INTERACTIVE MAP FOR PASSENGERS IN COMMERCIAL PASSENGER VEHICLE

(71) Applicant: Panasonic Avionics Corporation, Lake Forest, CA (US)

(72) Inventors: Andrew Mohr, Malmö (SE); Patrik Berg, Holmsund (SE); Andreas Hedin, Malmö (SE)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/563,674

(22) Filed: Sep. 6, 2019

(65) Prior Publication Data

US 2021/0075871 A1 Mar. 11, 2021

(51) Int. Cl.
| | |
|---|---|
| *G06F 3/048* | (2013.01) |
| *H04L 29/08* | (2006.01) |
| *G06F 3/0482* | (2013.01) |
| *G09B 29/00* | (2006.01) |
| *G09B 29/10* | (2006.01) |
| *H04W 4/48* | (2018.01) |
| *H04W 4/42* | (2018.01) |
| *H04B 7/185* | (2006.01) |

(52) U.S. Cl.
CPC ............ *H04L 67/18* (2013.01); *G06F 3/0482* (2013.01); *G09B 29/007* (2013.01); *G09B 29/106* (2013.01); *H04B 7/18508* (2013.01); *H04W 4/42* (2018.02); *H04W 4/48* (2018.02)

(58) Field of Classification Search
None
See application file for complete search history.

(56) References Cited

U.S. PATENT DOCUMENTS

| | | | | |
|---|---|---|---|---|
| 2012/0232791 | A1* | 9/2012 | Sterkel | H04H 20/62 |
| | | | | 701/454 |
| 2013/0030645 | A1* | 1/2013 | Divine | B60K 35/00 |
| | | | | 701/36 |
| 2014/0282038 | A1* | 9/2014 | Royster | G01C 21/206 |
| | | | | 715/738 |

(Continued)

FOREIGN PATENT DOCUMENTS

WO 2017089861 6/2017

*Primary Examiner* — William C Trapanese
(74) *Attorney, Agent, or Firm* — Perkins Coie LLP

(57) ABSTRACT

A system for displaying a map to passengers on a commercial passenger vehicle is disclosed. The system comprises a storage configured to store (1) personal information of passengers either located in or expected to board the commercial passenger vehicle; and (2) location-related information including location-related information associated with an area covered by the map; a server located in the commercial passenger vehicle and configured to perform a method comprising: sending, to a media playback device associated with a passenger, a message to display a list of selectable map features; receiving, from the media playback device, a selection of at least one map feature among the selectable map features; retrieving the personal information or the location-related information from the storage; and integrating retrieved personal information or retrieved location-related information to map data, thereby rendering the map.

19 Claims, 13 Drawing Sheets

(56) References Cited

U.S. PATENT DOCUMENTS

2014/0282727 A1  9/2014  Keen et al.
2015/0233717 A1  8/2015  Satti
2017/0268891 A1  9/2017  Dymaes et al.

* cited by examiner

DISPLAYING INTERACTIVE MAP FOR PASSENGERS IN COMMERCIAL PASSENGER VEHICLE

TECHNICAL FIELD

This document generally relates to an aircraft in-flight entertainment system including providing an interactive map for passengers in commercial passenger vehicles.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes exemplary vehicle entertainment systems that can provide an interactive map for passengers located in or expected to be in a commercial passenger vehicle. The interactive map can be customized and personalized to include various map features based on passengers' preferences. The map features can be shown as selectable identifiers that are displayed on the map to allow the passengers to customize and personalize the map.

In one representative aspect, the disclosed technology provides a system for displaying a map to passengers on a commercial passenger vehicle. The system may comprise: a storage configured to store (1) personal information of passengers either located in or expected to board the commercial passenger vehicle; and (2) location-related information associated with an area covered by the map; and a server located in the commercial passenger vehicle and configured to perform a method comprising: sending, to a media playback device associated with a passenger, a message to display a list of selectable map features; receiving, from the media playback device, a selection of at least one map feature among the selectable map features; retrieving, in response to the receiving, the personal information or the location-related information from the storage; and integrating retrieved personal information or retrieved location-related information to map data, thereby rendering the map.

In another representative aspect, the disclosed technology provides a method implemented by a server on a commercial passenger vehicle. The method may comprise: sending, by the server, a list of selectable map features that are to be displayed on a map to a media playback device associated with a passenger located in the commercial passenger vehicle, the selectable map features including a first map feature associated with passenger information of a passenger and a second map feature associated location-related information associated with an area covered by the map; receiving, from the media playback device, a selection of one of the selectable map features to be displayed on the map; receiving map data based on a predetermined setting; integrating the personal information of the passenger or the location-related information to the received map data; and rendering the map to include visualized items corresponding to the personal information or the location-related information.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Currently, airplanes or other commercial vehicles use conventional in-vehicle entertainment systems providing a moving-map. A moving-map system is a real-time flight information video channel to broadcast map information to screens located on the rear of the seat or to personal electronic devices (PEDs) (e.g., smartphone, laptops, tablets, or personal televisions) that belong to passengers. In addition to displaying a map that illustrates the position and direction of the plane, the moving-map system provides information including the altitude, airspeed, outside air temperature, distance to the destination, distance from the origination point, and local time. The information provided by the moving-map system is derived in real time from the aircraft's flight computer systems. The conventional moving-map systems show some aspects that enable a passenger to zoom and pan around a 3D world map using touch gestures, such as Android based touch-screen In-Flight Entertainment systems (IFE). However, the conventional moving-map system has a limitation in terms of customization and/or personalization of the map provided in the commercial vehicles and does not offer any opportunity for the passenger to interact with the map or with data on the map. Thus, it may be beneficial to provide a map that can be customized and personalized based on passengers' interests and preferences. If the map can be customized or personalized with information pertinent to each of the passengers, the passengers can more enjoy the travel. Also, by providing the customized or personalized map, it is possible to create more business opportunities for airline companies and other commercial vehicles to make additional profits. Upon the recognition of the above and others, this patent document provides various implementations of displaying an interactive map for a passenger in a commercial vehicle, which can allow more integration possibilities with existing systems and applications.

Figure 1:
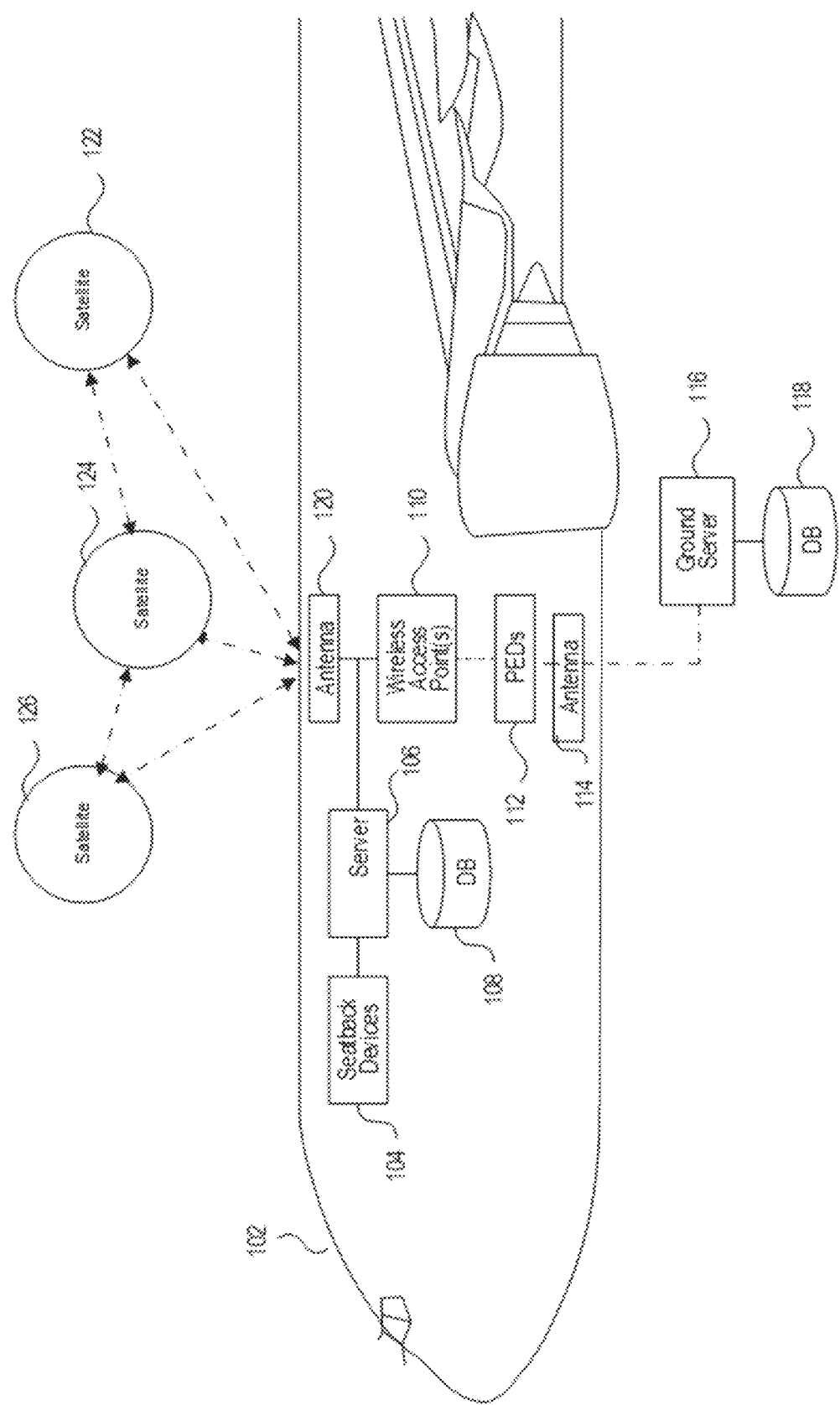
FIG. 1 shows an exemplary vehicle entertainment system installed in an airplane based on some implementations of the disclosed technology.

FIG. 1 shows an exemplary vehicle map system 100 installed in an airplane 102. The vehicle map system 100 includes a server 106 located in the airplane 102. The server 106 is communicably coupled to the seatback devices 104 and PEDs 112 to provide customized or personalized map to the seatback devices 104 and/or PEDs. For example, the server 106 includes a map module (shown as 225 in FIG. 2) that may configure an interactive map and send the interactive map to seatback devices 104 via an Ethernet switch, and the map module 225 may send map contents to PEDs 112 via one or more wireless access points 110. The seatback devices 104 and PEDs 112 can include appropriate applications stored thereon to display the map contents provided by the server 106. The PEDs 112 can wirelessly communicate with one or more wireless access points 110. Thus, the PEDs 112 can be in communication with the ground server 116 or another server via the wireless access point(s) 110 and the antenna 114. This connection can enable the PEDs to access the Internet even when the airplane 102 is flying and the PEDs do not have cellular connectivity.

In FIG. 1, the server 106 may be in communication with another server, e.g., a ground server 116, located on the ground (e.g., in an airport) via an antenna 114. The ground server 116 and the server 160 can communicate to exchange data and information to assist the displaying of the map to the seatback devices 104 and PEDs. For example, the server 106 can obtain from the ground server 116 information about passengers so that the server 106 can, based on such information, provide customized or personalized map to passengers. For example, when the airplane 102 is waiting at an airport to board passengers or while the passengers are boarding the airplane 102, the server 106 can obtain from the ground server 116 a list of predicted preferences about passengers that are located in or are expected to board the airplane. The ground server 116 may store the list of predicted preferences for the passengers in a database 118. The database 118 can be stored in the ground server 116. In addition, the server 106 can be in communication with a ground server 116 through satellites 122, 124, and 126 (for example, when at high altitude, flying over a body of water, or area where there is limited signaling from the ground) via an antenna 120. In yet another example, the server 106 can obtain information about passengers on-board the airplane 102, e.g., for example, typed in by the passenger on a Personal Electronic Device (PED), stored on the airplane, and the like, based partially and/or fully on such information, and/or combined with passenger information from another location off the airplane 102, e.g., ground server 116, to provide customized or personalized map to passengers.

Figure 2:
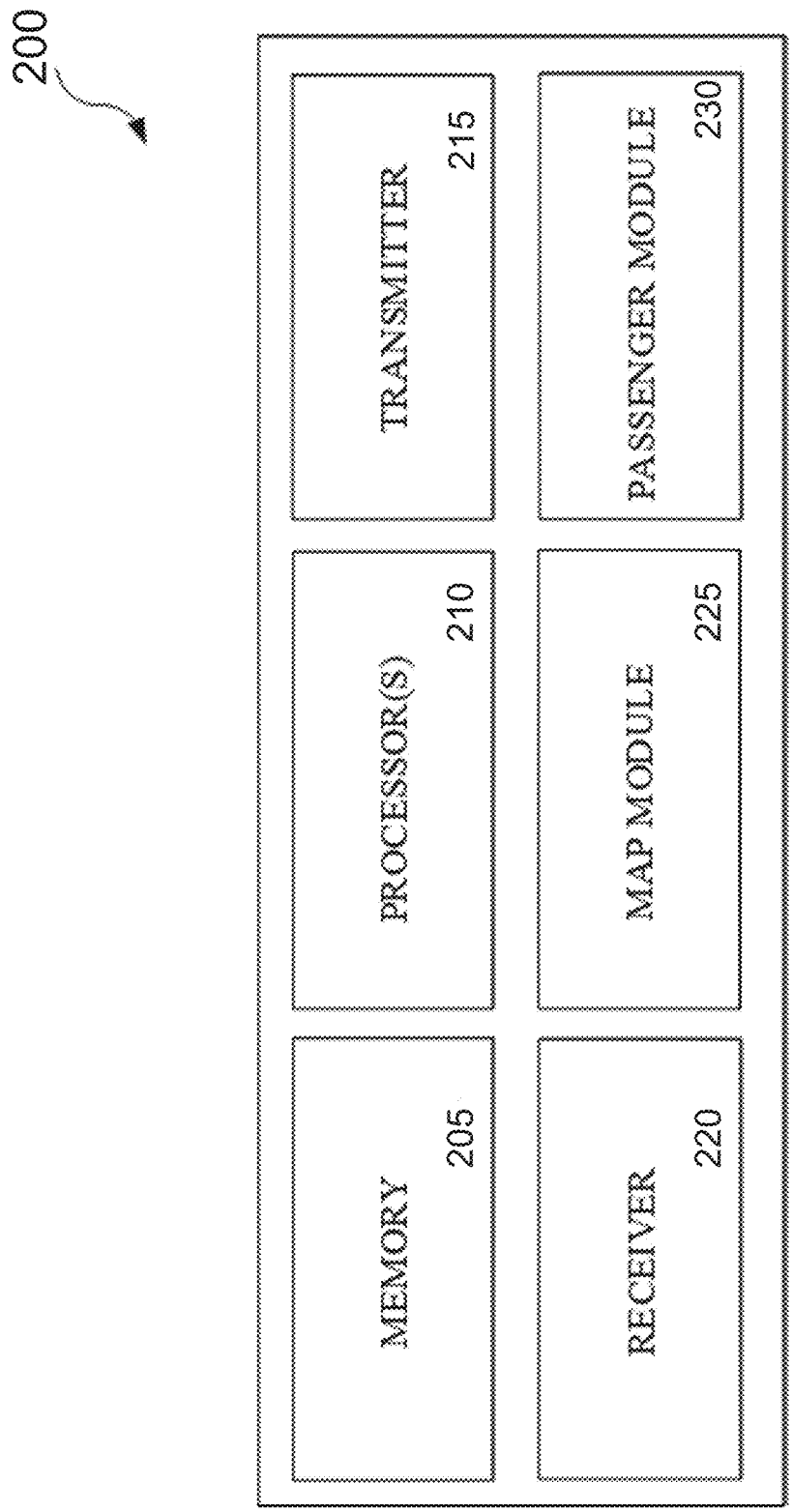
FIG. 2 shows an exemplary block diagram of a server based on some implementations of the disclosed technology.

FIG. 2 shows an example block diagram of a server that is a part of an exemplary vehicle map system. The server 200 includes at least one processor 210, a memory 205, a transmitter 215, a receiver 220, a map module 225, or a passenger module 230. The memory 205 may store instructions to be executed by the processor 210. The instructions upon execution by the processor 210 configure the server 200 to perform the operations (e.g., FIG. 3 or 9) which will be described in this patent documents. The transmitter 215 transmits or sends information or data to another device (e.g., another server 116, seatback devices 104, or PEDs 112). The receiver 220 receives information or data transmitted or sent by another device (e.g., another server 116, seatback devices 104, or PEDs 112).

The map module 225 of the server 200 is configured to perform operations to obtain the map data. For example, the map module 225 can determine the current position of the airplane and retrieves map data from the database 108. The map module 225 can also obtain additional location-related information associated with the area covered by the map. The additional location-related information may include point of interests, deals, weather, best restaurants, best bars, local wineries, etc. The database 108 includes map data for the majority of Earth's surface and additional location-related information associated with the area covered by the map. In some implementations, the map module 225 can extract the portion of the map data around the current position of the airplane for serving the map to the seatback devices 104 and PEDs 112. In some other implementations, the map module 225 obtains map data from an external source outside the airplane via a communication interface. Similarly, the map module 225 can obtain the additional location-related information from the database 108 or the external source. The server 200 receives the map data and the additional location-related information from the map module 225 and performs operations to personalize and customize the map based on implementations of the disclosed technology. For example, the server 200 can send a list of map features to the seatback devices 104 and PEDs 112, the map features corresponding to personalized/customized items to be added to the map, receive a selection of the map feature from the seatback devices 104 and PEDs 112, retrieving information to personalize and customize the map based on the selection of the map feature, and integrating the retrieved information to the map, thereby rendering the personalized and customized map to the seatback devices 104 and PEDs 112.

As will be further explained later, the server 300 can send the list of the map features, e.g., 'my flight history,' 'my POIs,' 'weather,' 'deals,' 'restaurants,' etc. to the seatback devices 104 and PEDs 112 such that the passenger can make a selection as to which map feature he or she wants to display on the map. Some of the map features include items associated with the passenger information. The server 200 can obtain the passenger information from the passenger module. The passenger module 225 is configured to obtain information on passengers including names, prior travel histories, current travel information, preselected point of interests, interests, hobbies, etc. The information about passengers may be utilized to customize and personalize the map for passengers and can be collected in various manners. For example, the passenger information can be obtained by the airlines and/or by a third-party prior to boarding of a corresponding passenger. In some implementations, if the passenger information was previously obtained and is stored in the relevant database, the server 200 can collect the passenger information from the relevant database.

In some embodiments, for each flight, the ground server 116 may obtain names of the passengers that are expected to board the airplane 102 and the one or more map setting preferences previously indicated by at least some of the passengers who they signed up for the airplane's frequent flyer program. In such embodiments, the one or more map setting preferences may be stored in a database that manages an airlines' frequent flyer program. This server's database associates the map setting preferences of the passengers with their frequent flyer membership identifiers. When passengers enter their names and frequent flyer identifiers to purchase their tickets, the passengers' names and frequent flyer identifiers can be sent to the ground server 116 whereupon the ground server 116 can retrieve the map setting preferences associated with the frequent flyer identifiers from the frequent flyer program related server. The passenger module of the ground server 116 can store the list of passenger preferences associated with the names of the passengers that are expected to board the airplane 102, which includes the map setting preferences.

In some other embodiments, for each flight, the ground server 116 may obtain names of the passengers that are expected to board the airplane 102 and one or more additional personal information about the passengers (e.g., birthdate, country of birth, career interest, etc.) to be included in the list of passenger preferences. The additional personal information can be transmitted from the ground server 116 to the server 200 and the additional personal information can be utilized by the map module 225 of the server 200 to personalize and customize the map provided to the passenger. In some embodiments, the ground server 116 can provide the birthdate information of the passenger to the server 200 and the birthdate information can be utilized to personalize and customize the map with the deal for the passenger who is travelling in the birthday month. In some implementations, the passenger information can be obtained from the passengers after the passenger boards on the airplane 102. The passenger module 225 can send to the server 106 the seat numbers of the passengers and the associated one or more predicted preferences of the passengers so that the server 106 can send commands or messages to the appropriate seatback devices 104 to display map tailored to the passengers.

Figure 3:
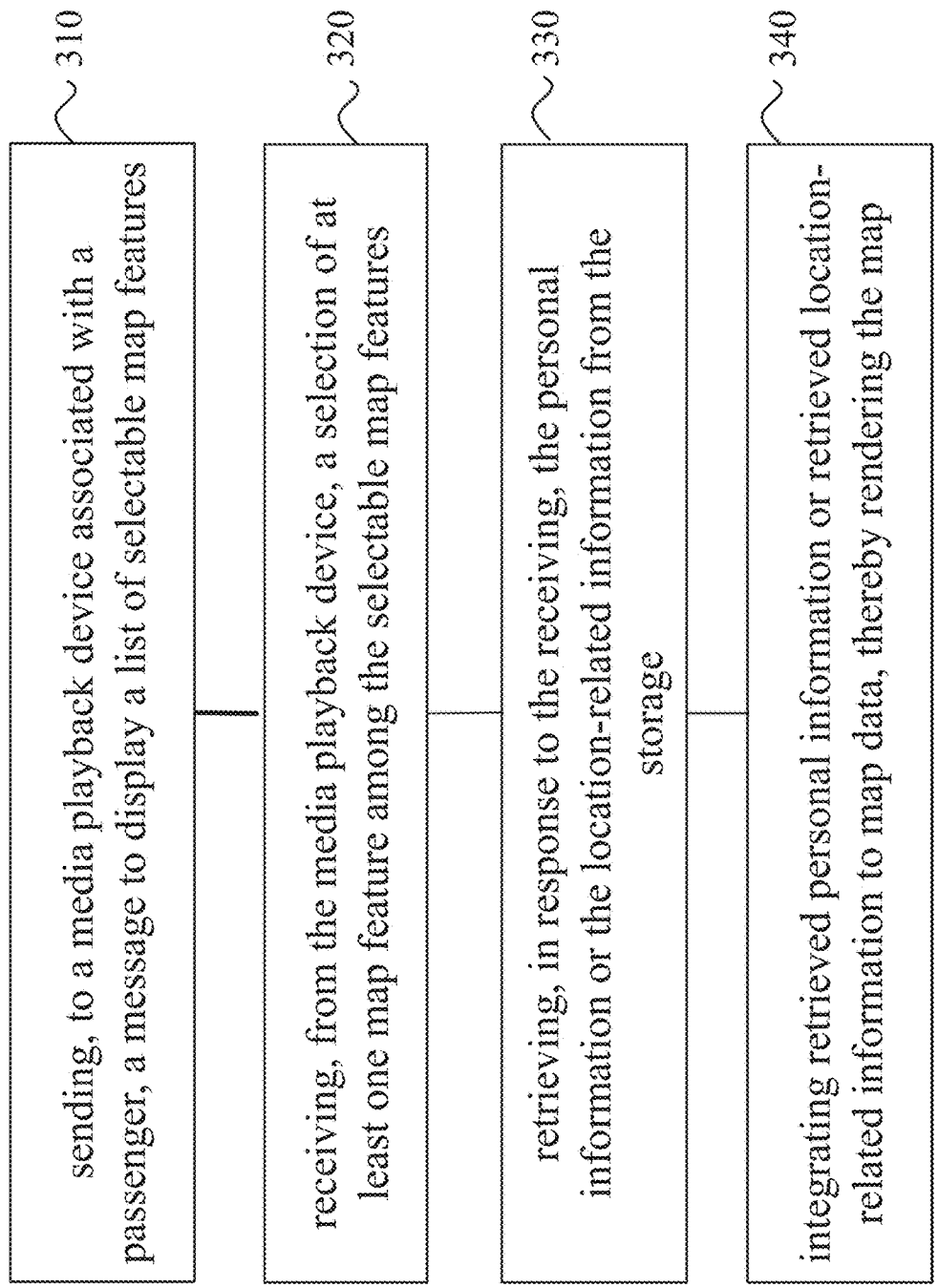
FIG. 3 shows an example of instructions executed by a server of a vehicle map system based on some implementations of the disclosed technology.

FIG. 3 shows an example of instructions executed by a server of a vehicle map system. As shown in FIG. 3, the instruction 310 instructs the server to send, to the seatback devices or PEDs, a list of selectable map features that are to be displayed on the map upon a selection from the passenger. In some implementations, the list of the selectable map features may be displayed using a graphical user interface (GUI) of the seatback devices or PEDs including selectable icons corresponding to the map features to allow the passenger to make a selection of a map feature included in the list. If the passenger selects a map feature he or she wants to show on the map, the selected map feature is integrated to the map data and thus the map displayed on the seatback devices and PEDs shows the visualization corresponding to the selected map feature. Since the selection of the map feature that is to be displayed on the map is made by the individual passenger, the maps provided to the seatback devices or PEDs are not same as one another. Thus, it is possible to personalize or customize the map provided to the individual passenger by sending the list of map features. In some implementations, personalizing or customizing the map includes providing the map as a default set in a preferred language of the passenger based on prior passenger preferences. In some implementations, personalizing or customizing the map includes an option to choose a language shown on the map, the option selectable by the passenger. In some implementations, once being provided with the list of map features, the passenger can choose at least one of the map features and the selection can be stored as the preferred map setting in the related database or passenger module. The server can utilize the preferred map setting information to configure the list of map features. In this case, for some passengers whose preferred map setting information has been already available, the server can provide the preferred list of map features. Various UI (user interface) and UX (user experience) designs can be implemented to provide the map service disclosed in this patent application. Predesigned, prebuilt, or pretested UI modules can be included in the vehicle map system or operate together with the vehicle map system as a separate hardware element.

In some implementations, the selectable map features include a map feature associated with passenger information which includes, for example, travel history of a passenger, profile of the passenger, preferred map settings, preferred points of interests, etc. The passenger information can be obtained in multiple manners and is stored in the passenger module. In some implementations, the passenger information can be obtained during the process to customize and personalize the map through the exchange of messages between the server and the seatback devices and/or the PEDs. In some implementations, the passenger information was previously obtained from a past travel and is stored in the passenger module. In some implementations, the passenger information can be shared by an association of several airplane companies and thus can be retrieved from an external database to the database in the map service system.

In some implementations, the selectable map features include a map feature associated with location-related information which includes, for example, point of interests, deals, weather, best restaurants, best bars, local wineries, etc. The map features such as point of interests, deals, weather, best restaurants, best bars, local wineries, etc. are considered as the location-related information since each of the map feature items has at least some geographical relationship with an area covered by the map. The degree of the relationship can be preset. Generally, the degree of the geographical relationship required for the map features to be shown on the map can be set low not to put the unnecessary limitations and to provide more information to the passenger. For example, the degree requirement is met if some events or deals are associated with an area covered by the map. The map module obtains the location-related information including points of interests, deals, weather, best restaurants, best bars, local wineries, etc. from the database in the vehicle map system or outside database.

Figure 4:
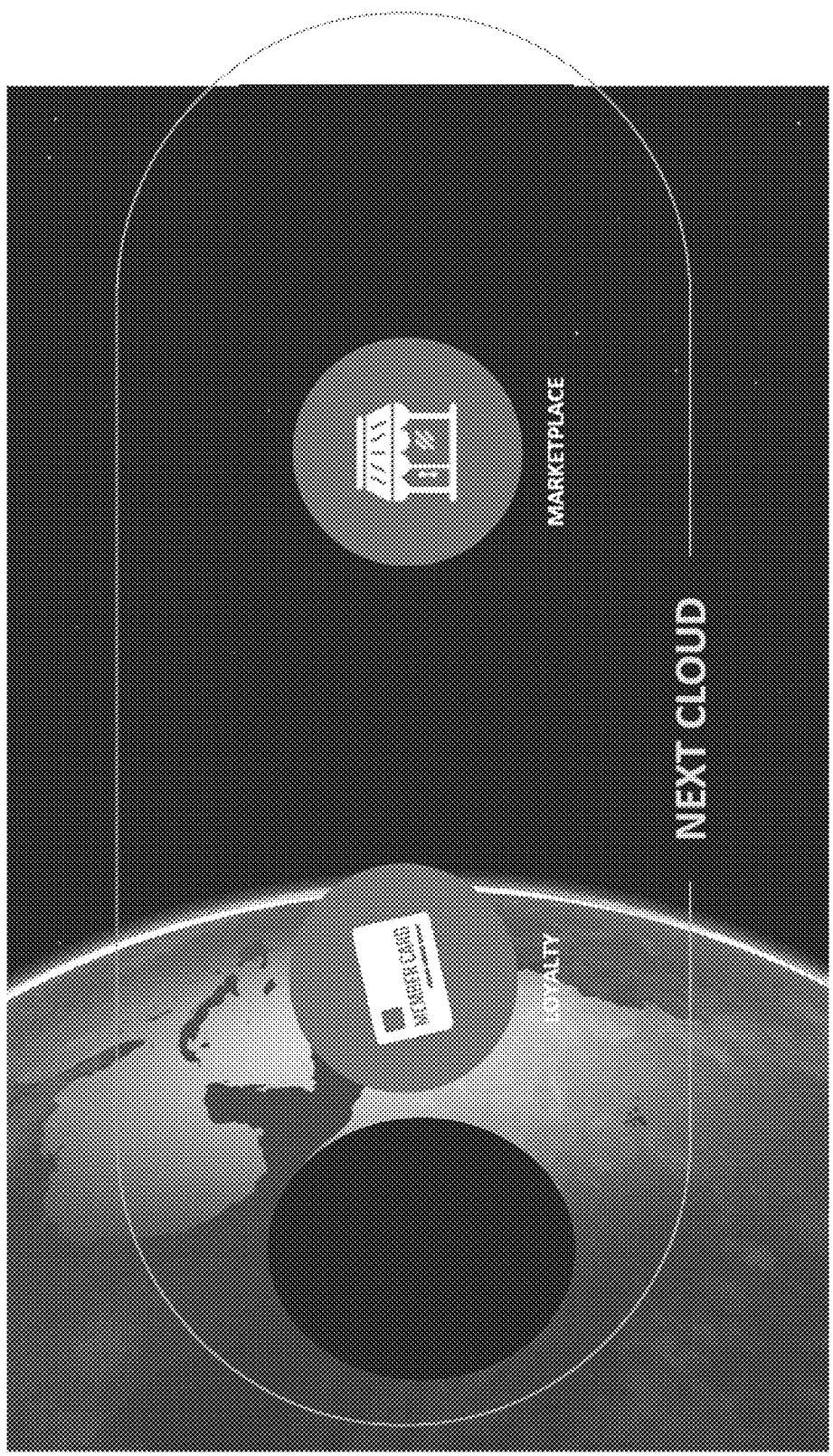
FIG. 4 shows an example of a screen illustrating a list of selectable map features that are provided based on some implementations of the disclosed technology.

FIG. 4 shows an example of a screen illustrating a list of selectable map features. In FIG. 4, 'Loyalty' icon and 'Marketplace' icon are included as part of the mapping features to assist the passenger to personalize their user experience while using one or more mapping features. The 'Loyalty' icon map feature associated with passenger information may correspond to and/or exhibit consistent passenger purchases of one or more certain and/or branded products or services over an extended time. On the other hand, the Loyalty icon map feature associated with passenger information may represent passenger loyalty for choosing to buy products/services from one particular manufacturer, retailer, and/or service center or provider. In some implementations, the Loyalty icon map feature associated with passenger information may also represent a percentage of yesterdays, todays, or future customers and/or other passengers who buy consistently one or more particular products or services from one particular manufacturer, retailer, and/or service center or provider. The 'Marketplace' icon may correspond to the map feature associated with the location-related information. The map features and icons as shown in FIG. 4 are examples only and can be modified in various manners to provide various aspects for the customization and personalization of the map. Although FIG. 4 shows two selectable icons respectively corresponding to map features associated with the passenger information and the location-relation information, the number of icons is not limited. Thus, the server 106 can provide more than two selectable map features in the list. For example, another example of the list of the selectable map features can include five selectable map features, 'my flight history,' 'my POIs,' 'weather,' 'deals,' 'restaurants.'

In addition, in one or more embodiments, the usage information obtained from the passenger, e.g., input from PED or in-flight entertainment communication (IFEC), can be updated locally on the on-board server of the airplane 102 and/or off the airplane 102 on an off-airplane server, for example, before take-off, during flight, or at the end of flight after landing of the airplane In some implementations, the list of the selectable map features may be preset. In some implementations, the list of the selectable map features can be updated based on the selection made by the passenger. In some embodiments where the passengers use PEDs to obtain the customized or personalized map, the map module can send commands to the PEDs associated with the passengers to show a list of map features to display a map based on the preferred map setting of the passengers. For example, when a passenger first starts using his or her PED on the airplane, the passenger may enter his or her seat number or name via the GUI on the PED, and the PED can send such information along with the PED's identifier (e.g., MAC address or IP address) to the passenger module of the server. Based on the received seat number or name of the passenger and the obtained list of passenger preferences, the passenger module can associate one or more preferred map setting of the passenger with the PED operated by the passenger. The passenger module can send the one or more preferred map setting and the associated PED identifiers to the map module. Thus, for PEDs operated by a plurality of passengers, the content module can use the PED identifiers and the associated one or more preferred map setting of the passengers to send commands or messages to the appropriate PED to display the map tailored to the passengers. A PED can display on a GUI information about one or more entertainment options based on the one or more predicted entertainment preferences of a passenger that operates that PED.

In some implementations, the selectable icons on the GUI can also enable a passenger to indicate whether he or she prefers the displayed information on the map. In an example implementation, for a displayed map feature, one or more selectable passenger preference indicators such as a "like" and/or "dislike" button(s) are displayed adjacent to (e.g., top or bottom of) the selectable icon. If a seatback device or PED receives indications via its GUI that a passenger "likes" deal information and "dislikes" weather information, the seatback device or PED can send to the passenger module of the server 106 a message that includes such updated preferences. Since the passenger module stores the list of passenger preferences in the database, the passenger module can update the map preferences stored in the database 108 for a passenger based on the one or more updated preferences received in the message from a PED.

The server can update the list of selectable map features stored in the database 108 based on receiving messages that indicate whether passengers have liked or disliked the map feature displayed on the map. In some embodiments, the server can update the list of map features in-flight based on the messages from the passengers. The server may transmit to the ground server via the antenna the updated list of the map features as preferred map setting for a passenger so that the ground server can update the list of map features stored on database. For example, after the airplane has landed at its destination, the server may transmit the updated list of map features to the ground server. In some embodiments, the server can transmit the updated map preference of one or more passengers to the ground server so that the ground server can update the list of map features as passenger preferences stored on the database. The server and/or the ground server updating the list of map features can be beneficial at least because such a list can enable the server to provide tailored map to each passenger for whom one or more map preferences is known and updated. Thus, for example, if a passenger updates one or more map preferences during a flight on a first airplane and then subsequently travels on a second airplane, the server of the second airplane can use the updated map preference for the passenger to better provide the map tailored to that passenger. In this example, the ground server may provide to the server of the second airplane the list of map features for the passenger that is related to the updated passenger preference.

Figure 5A:
FIG. 5A show an example of a map showing visualizations corresponding to selected map features in response to the selection of the 'Loyalty' icon based on some implementations of the disclosed technology.
Figure 5B:
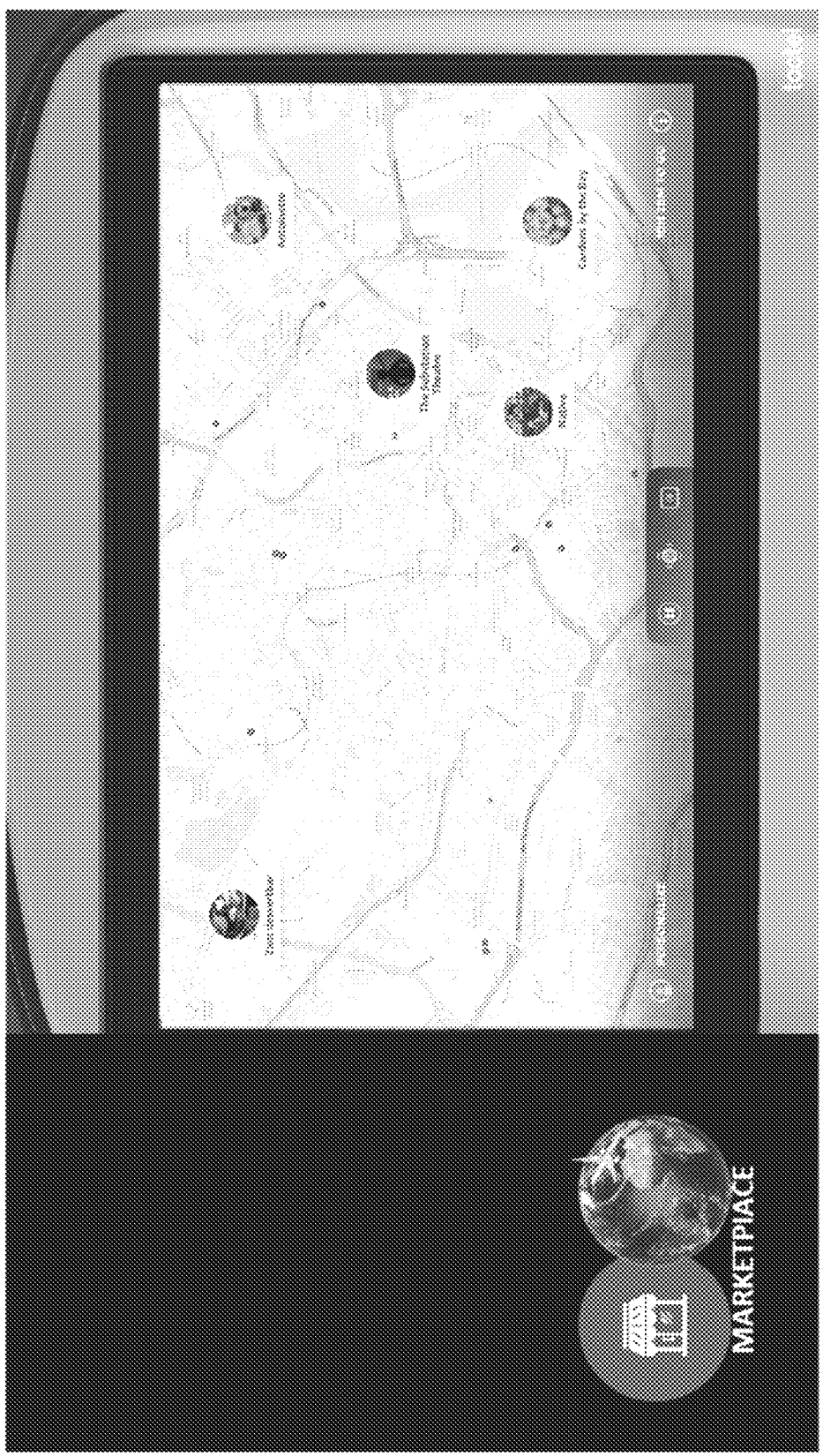
FIG. 5B shows an example of a map showing visualizations corresponding to selected map features in response to the selection of the 'Marketplace' icon based on some implementations of the disclosed technology.

Referring back to FIG. 3, according to the instruction 320, the server 106 of the vehicle map system 100 receives, from the seatback devices 104 or PEDs 112, the selection of the map feature that is integrated to the map. Upon receiving the selectable map features to be integrated to the map (instruction 320), the passenger can choose a map feature based on his or her preferences by, for example, clicking a corresponding icon. In some implementations, the passenger can choose multiple map features. The selection made by the passenger is transmitted to the vehicle map system. Upon receiving the passenger's selection, the instruction 330 causes the server of the vehicle map system to retrieve information needed to customize and personalize the map for the passenger. For example, if the passenger choses the map feature associated with the personal information (e.g., clicking the 'Loyalty' icon), the server retrieves personal information including prior travel history, preselected points of interests (POIs), preferred map settings, etc. FIG. 5A show an example of a map showing visualizations corresponding to selected map features in response to the selection of the 'Loyalty' icon. In another implementation, if the passenger chooses the map feature associated with the marketplace information (e.g., clicking the 'Marketplace' icon), the server of the vehicle map system retrieves location-related information including weather, an event, a deal, etc. FIG. 5B shows an example of a map showing visualizations corresponding to selected map features in response to the selection of the 'Marketplace' icon.

Figure 6A:
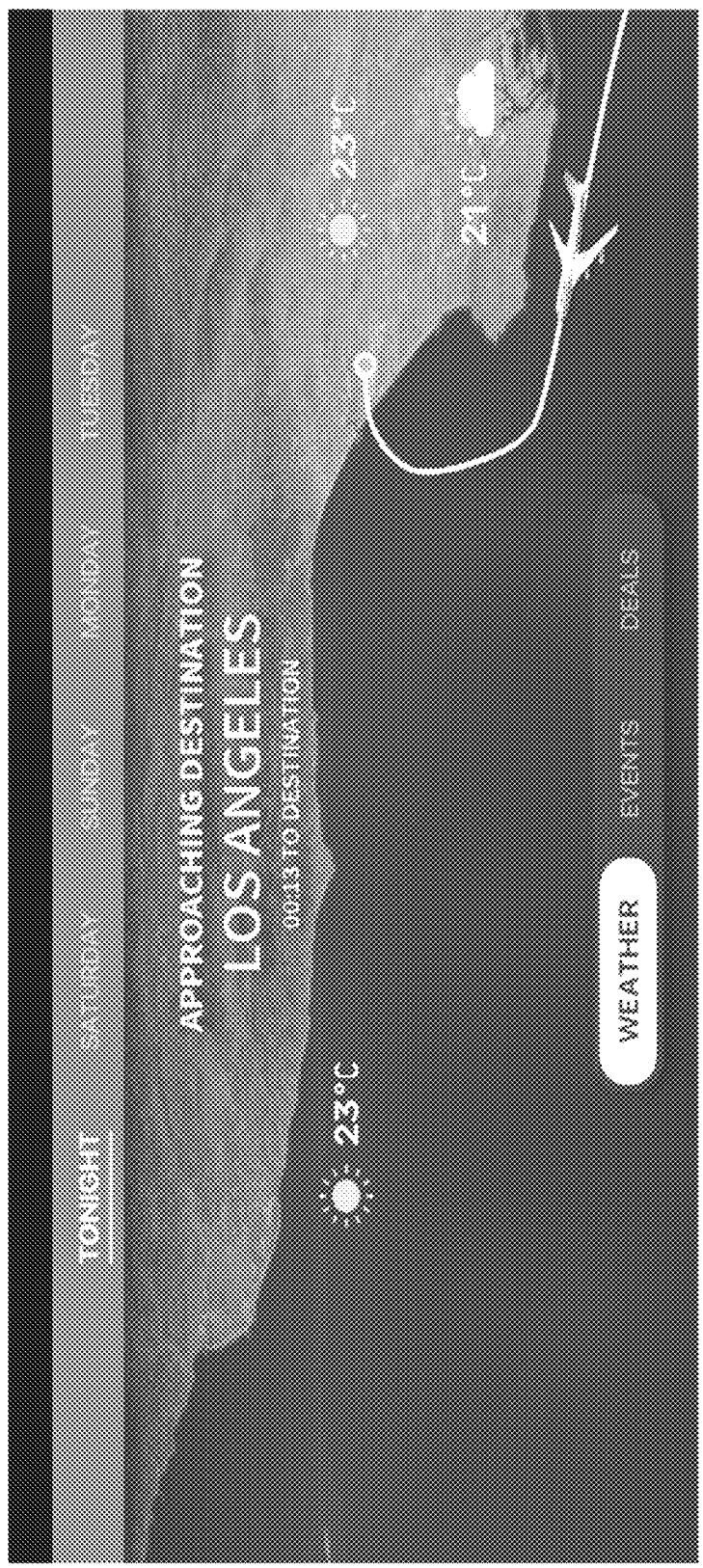
FIGS. 6A to 6C show examples of maps provided to a passenger and showing visualizations corresponding to selected map features based on some implementations of the disclosed technology.
Figure 6B:
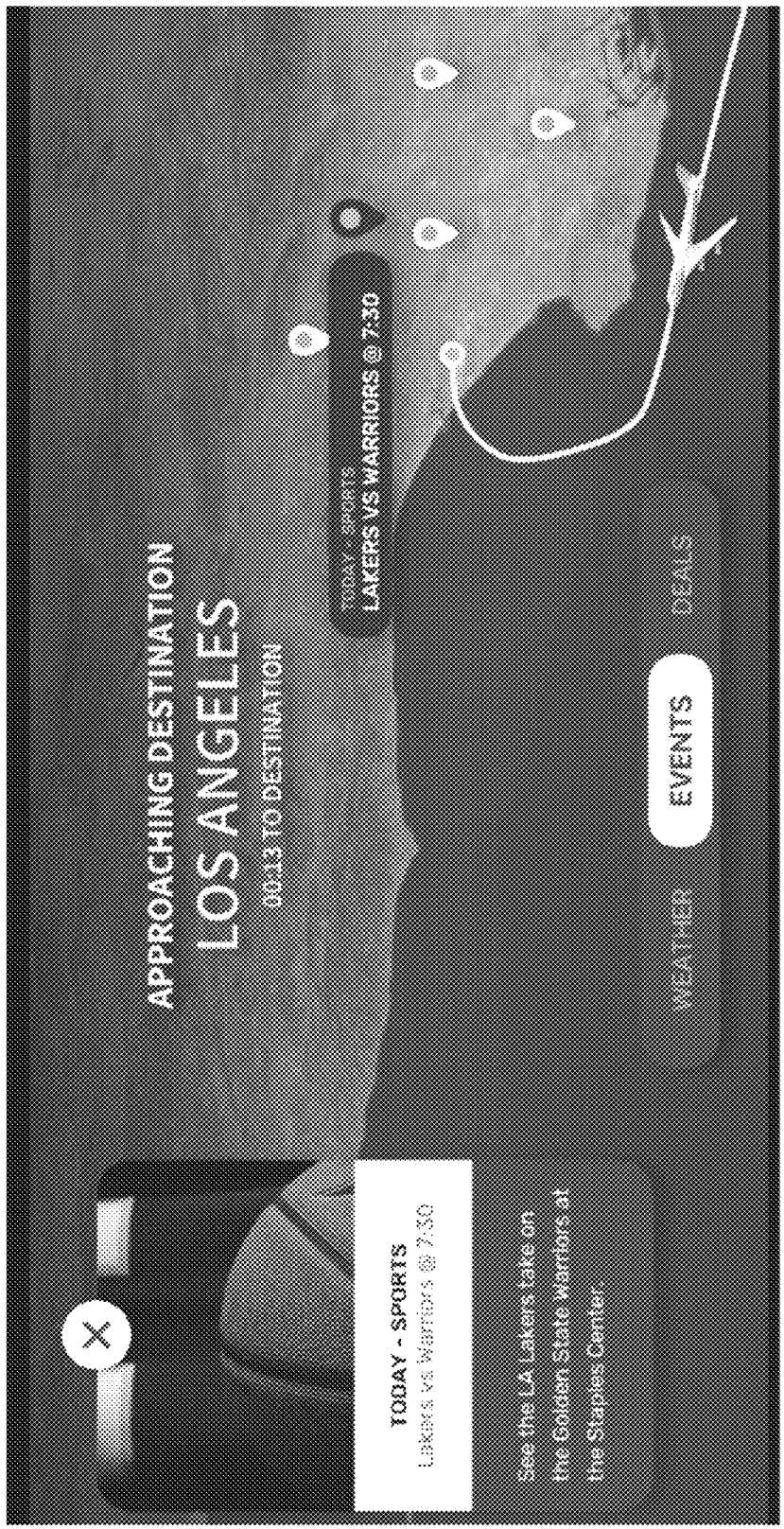
Figure 6C:
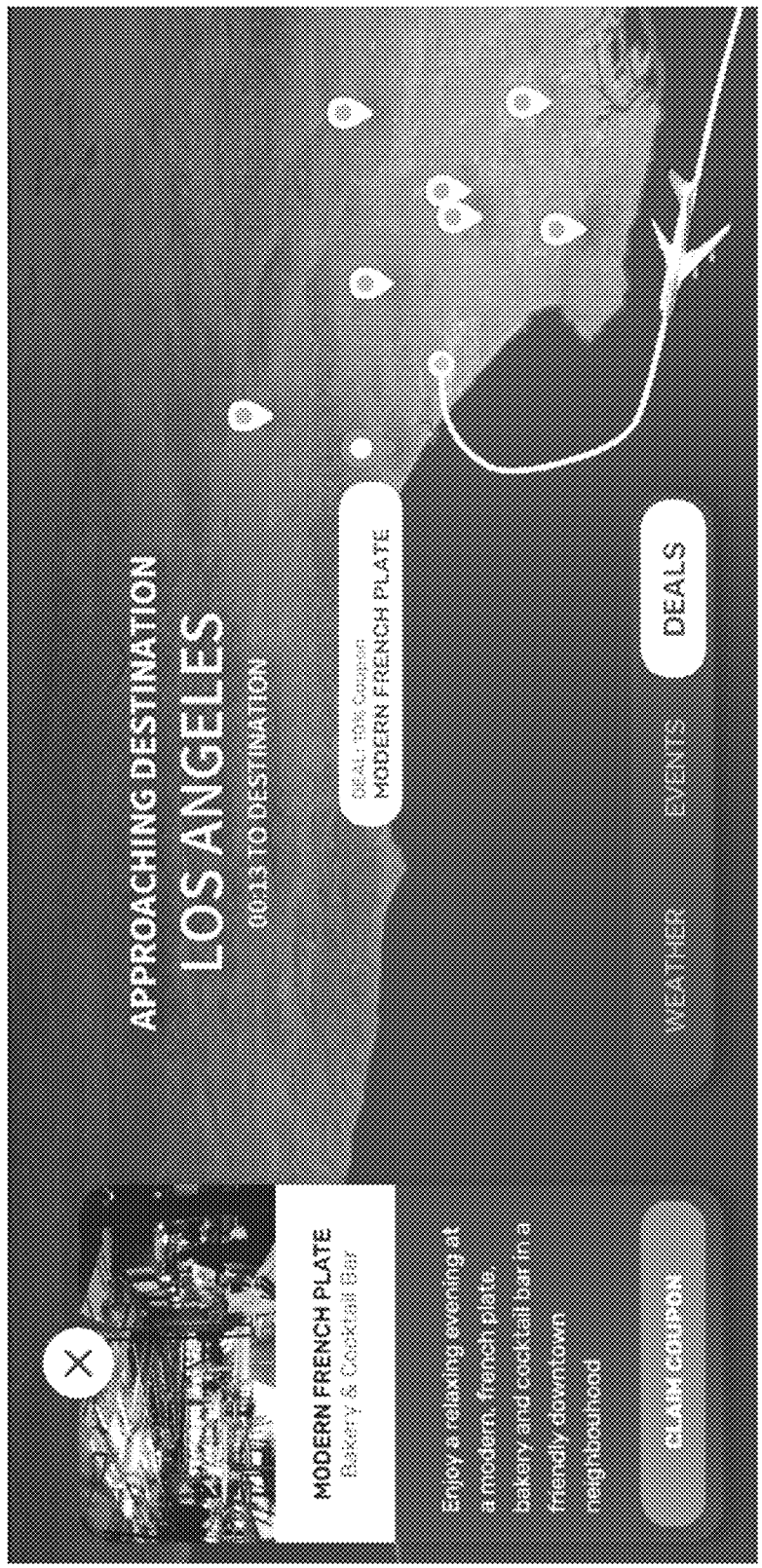

FIGS. 6A to 6C show examples of maps showing visualizations corresponding to selected map features. FIG. 6A shows an example of a map that is provided when a passenger selects the weather as the map feature to be integrated to the map. As shown in FIG. 6A, the map includes visualizations indicating weather information of some locations displayed on the map. In some implementations, the map service system 100 can further include a weather module to retrieve weather information corresponding to an area displayed on the map and providing weather information to the map module 325. FIG. 6B shows an example of a map that is provided when a passenger selects the event as the map feature to be integrated to the map. In a specific example of FIG. 6B, as the airplane approaches the destination, i.e., Los Angeles, the event information on the basketball game is displayed with the map. The event to be displayed on the map can be selected in various manners. In some implementations, the server can obtain passenger information, e.g., interests or hobbies, from the passenger module to select an event to be displayed on the map. By displaying the event that is pertinent to the passenger's interests, the passenger can more enjoy the display of the map. In addition, attracting passengers to a particular event and leading the passenger to attend the particular event can provide more business opportunities. In some implementations, the server 106 can choose an event without using the passenger information. For example, the event which has most reviews from others or which occurs nearby the airport can be displayed on the map. In some implementations, the server 106 can obtain the preference of the passenger for the selection of the event to be integrated on the map, e.g., whether to use the personal information or not, during a map providing service. In some implementations, the server 106 can obtain such preference from the passenger module if the passenger has previously made the selection and such selection is stored in the passenger module.

FIG. 6C shows an example of a map that is provided when a passenger selects the deal as the map feature to be integrated to the map. In an example of FIG. 6C, as the airplane approaches the destination, i.e., Los Angeles, a restaurant deal is displayed with the map. The selection of the deal displayed on the map can be done in various manners as explained above for the case of the event. The deal selected in consideration of the passenger information can incases the likelihood of the passenger to get interested and perform an action to the deal, for example, purchasing the deal. In some instances, the deal selected based on the popularity or location separately from the passenger information can lead the passenger's action depending on passenger's personalities. In some implementations, the server can be configured to provide more information on the events and the deals that are provided on the map and allow the passenger to interact with events and deals that are provided on the map. In this case, the server 106 may include an application module to perform retrieving information on events and deals, selecting events and deals for passengers, providing information events and deals, and supporting a transaction to purchase events and the deals.

Referring back to FIG. 3, the instruction 340 configures the server of the vehicle map system to integrate the retrieved information to map data and render the map. The server 106 can render a visual map environment on the seatback devices 104 and PEDs 112 using the map applications stored on the map module. The server combines all the necessary data in the visual map, which is then broadcast to the seatback devices 104 and PEDs. The applications assisting the rending of the integrated map can be described in FIGS. 8 and 9 which will be included later in this patent document.

Figure 7:
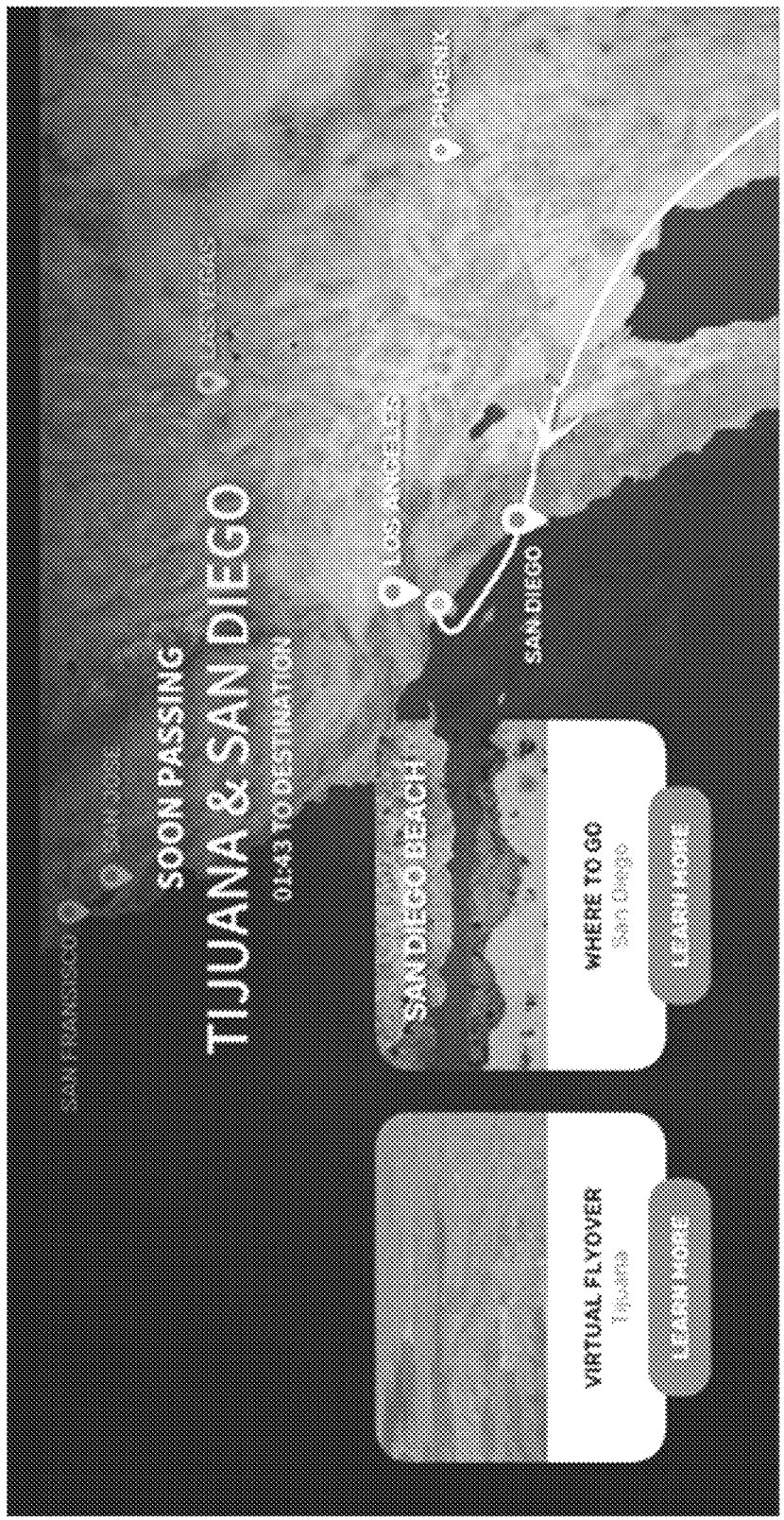
FIG. 7 shows an example of a screen provided to a passenger upon a selection of a region to be integrated to a map based on some implementations of the disclosed technology.

Some implementations of the disclosed technology can allow the passenger to select one or more regions to be integrated on the map. As discussed above, the map module provides the map data based on the current position of the airplane and the server adds some visualization corresponding to the map feature selected by the passenger to provide the map tailed to the passenger. In some implementations, the server can allow the passenger to enter a name of the area to be added to the map. FIG. 7 shows an example of a map that is provided to the passenger upon a selection by the passenger of 'Tijuana' as the region to be integrated on the map. Upon receiving the selection of the region from the seatback devices and PEDs, the server is configured to provide an illustration of a virtual fly over to Tijuana. This illustration can be provided with some marketing information for a possible next trip or a possible interruption to the current trip, which provides some business opportunities for the airline.

Figure 8:
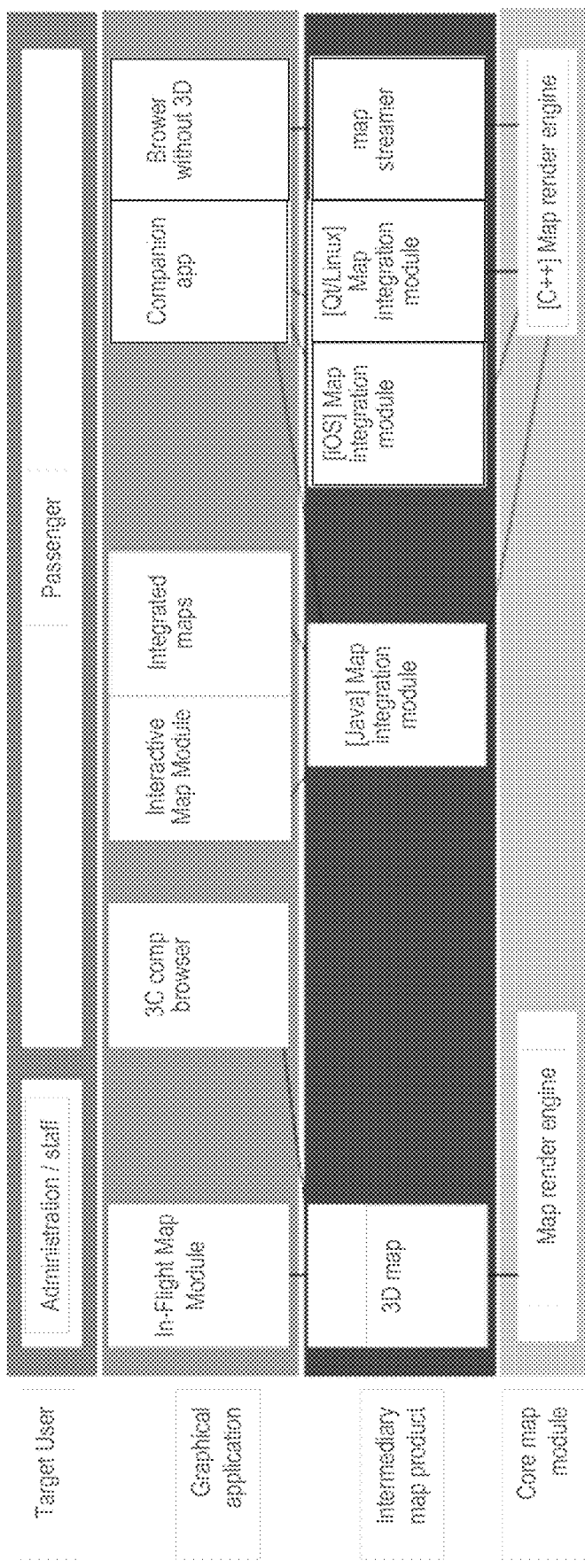
FIG. 8 shows an exemplary block diagram showing a module hierarchy based on some implementations of the disclosed technology.

FIG. 8 shows an exemplary block diagram showing a module hierarchy based on some implementations of the disclosed technology. As shown in FIG. 8, multiple graphical applications, e.g., in-flight studio application, 3D browser application, interactive map application, integrated map application, companion application, non-3D browser application, can be implemented to assist the server to provide the map based on some implementations of the disclosed technology. The in-flight studio application assists the administration/staff of the airplane to perform the operations to provide integrated map. The remaining modules assists the passengers of the airplane to perform the operations to provide the integrated map. Those applications can operate together with intermediary map products including 3D map application, MAP integration modules, map streamer module. The MAP integration modules can be provided in multiple modules depending on the platform used by the seatback devices and PEDs of the passengers.

Figure 9:
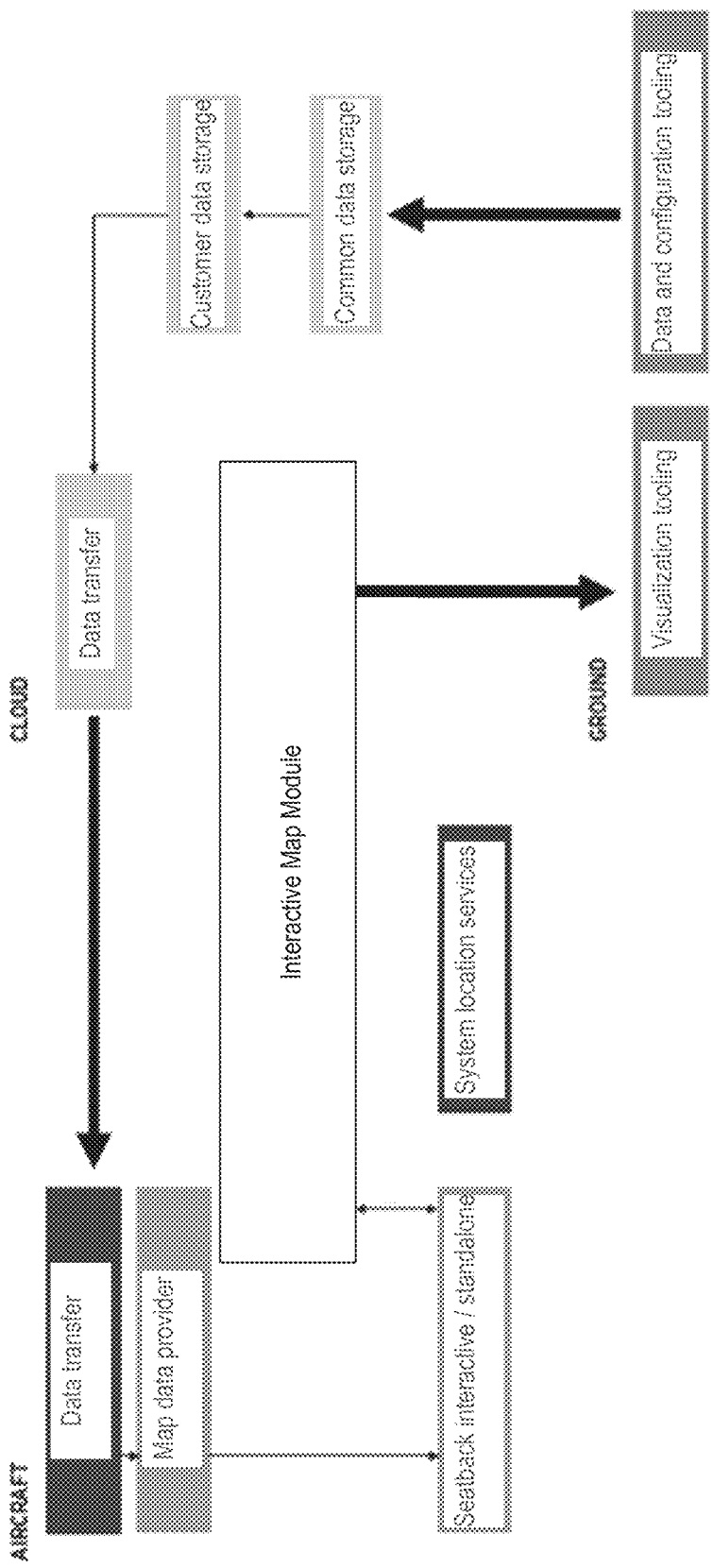
FIG. 9 shows an example of a data flow chart based on some implementations of the disclosed technology.

FIG. 9 shows an example of a data flow chart based on some implementations of the disclosed technology. As shown in FIG. 9, the data transfer to provide the personalized and customized map to the passengers can occur between the airplane and the ground. In some implementations, the cloud-based data transfer can be implemented. For example, at the ground, two modules, i.e., one corresponding to visualization tooling and the other corresponding to the data and configuration tooling, are located. The passenger data can be provided from the ground to the airplane using the cloud-based data transfer. At the airplane, the map data provider module is configured together with the seatback interactive/standalone application. The interactive map module can be implemented to provide the customized and personalized map based on the data transfer occurred between the airplane and the ground.

Figure 10:
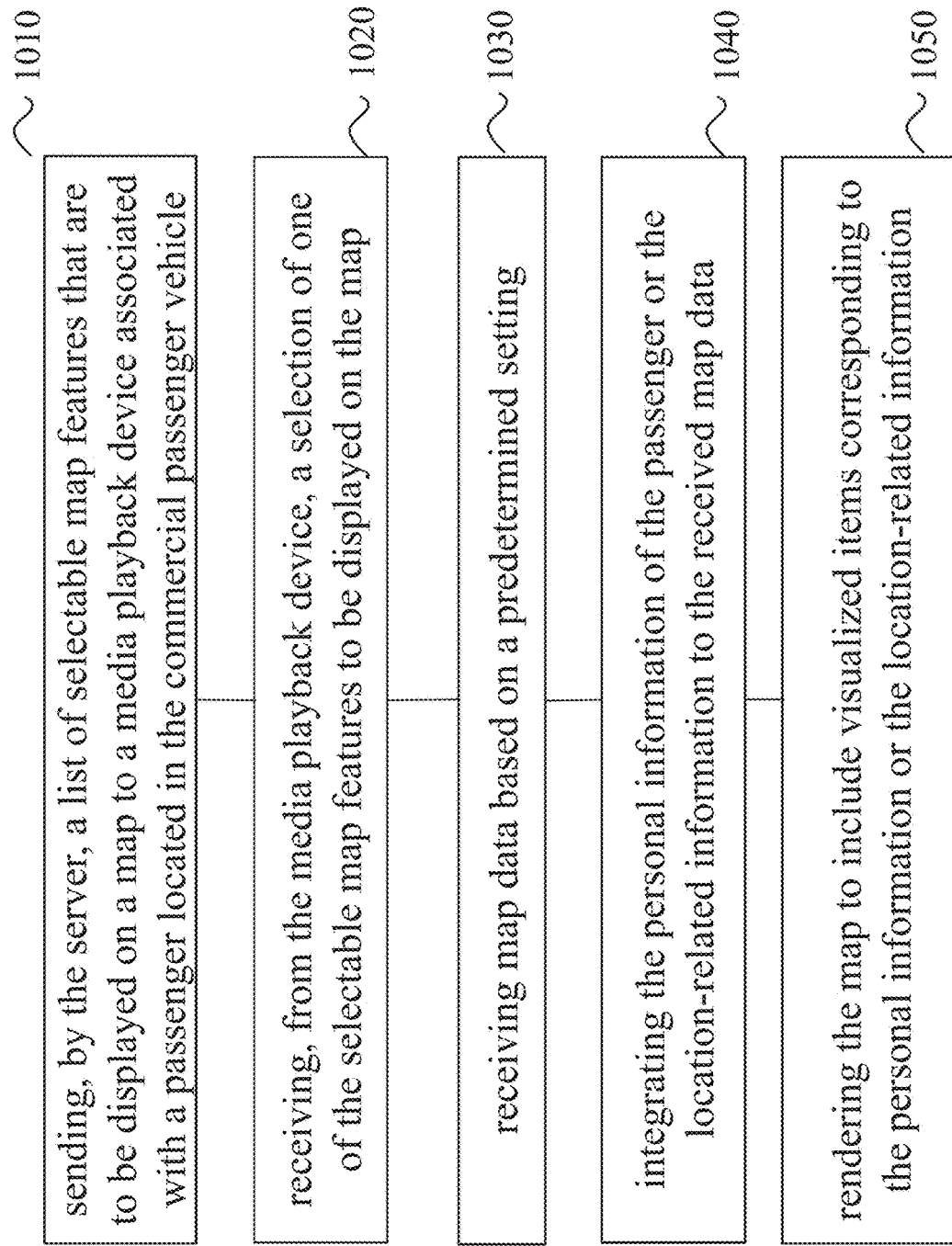
FIG. 10 shows an example flowchart of a method of displaying interactive map for passengers in commercial passenger vehicle.

FIG. 10 shows an example flowchart of a method of displaying interactive map for passengers in commercial passenger vehicle. At step 1010, the server 106 sends a list of selectable map features that are to be displayed on a map to a media playback device associated with a passenger located in the commercial passenger vehicle. The media playback device may one of the seatback devices 104 or PEDs 112. The selectable map features may include a first map feature associated with passenger information of a passenger and a second map feature associated with location-related information including points of interests. At step 1020, the server 106 receives from the media playback device, a selection of one of the selectable map features to be displayed on the map. At step 1030, the server 106 receives the map data based on a predetermined setting. At step 1040, the server 106 integrates the personal information of the passenger or the location-related information to the received map data. At step 1050, the server 160 is configured to render the map to include visualized items corresponding to the personal information or the location-related information.

In some implementations, the personal information includes at least one of current travel information, prior travel information, a preferred map setting, or preselected points of interests. In some implementations, the points of interests correspond to points near a travel path of the commercial passenger vehicle or correspond to points of an area selected by the passenger regardless of the travel path. In some implementations, the location-related information further includes at least one of weather, an event, or a commercial deal that is associated with at least one of the location-based information. In some implementations, the server 106 is configured to further perform, after the rendering the map, receiving, from the media playback device, a selection of a possible destination; retrieving travel information to the selected destination including at least one of an airport or flight; providing the retrieved travel information to the media playback device. In some implementations, the travel information to the selected destination is provided to suggest a possible interruption to a current itinerary of the passenger. In some implementations, the media playback device is a mobile device that belongs to the at least one passenger. In some implementations, the media playback device is located behind a headrest of a seat in the commercial passenger vehicle This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for displaying a map to passengers on a commercial passenger vehicle, the system comprising:
   a storage configured to store (1) personal information of passengers either located in or expected to board the commercial passenger vehicle; and (2) location-related information associated with an area covered by the map;
   a server located in the commercial passenger vehicle and configured to perform a method comprising:
      sending, to a media playback device associated with a passenger, a message to display a list of one or more preferred selectable map features including at least one of a loyalty icon map feature and a marketplace icon map feature that are tailored to the passenger and associated with the location-related information and personal information of the passenger, wherein, upon a selection of a corresponding preferred selectable map feature by the passenger, at least one of the location-related information or the personal information of the passenger is to be represented with corresponding visualizations in the map to be provided to the media playback device on a first screen that is provided to the passenger before a second screen displaying the map, and wherein the list of one or more preferred selectable map features is configured to allow the passenger to determine whether the map is to be displayed on the second screen based on the personal information of the passenger or the location-related information;

receiving, from the media playback device, a selection of at least one map feature among the one or more preferred selectable map features;

retrieving, from the storage, in response to the receiving of the selection of the at least one map feature, the personal information or the location-related information that is related to a selected map feature; and integrating retrieved personal information or retrieved location-related information to map data, thereby rendering the map such that a rendered map includes the corresponding visualizations to the selected map feature, wherein the rendered map is displayed on the second screen of the media playback device associated with the passenger only among passengers in the commercial passenger vehicle, and wherein the loyalty icon map feature is associated with personal information including at least one of a travel history of the passenger, a purchase trend of the passenger, a profile of the passenger, a preferred map setting, or preselected points of interests and the marketplace icon map feature is associated with location-related information including at least one of points of interests, weather, an event, or a commercial deal that is associated with the at least one of the points of interests, and wherein the server is further configured to receive the list of one or more preferred selectable map features from an additional server that stores a previously updated list of one or more preferred selectable map features that has been updated based on the passenger's selection during a previous travel.

2. The system of claim 1, wherein the server is further configured to perform:

updating the list of one or more preferred selectable map features based on the selection of the at least one map feature.

3. The system of claim 1, wherein the server is further configured to obtain at least one of the point of interests, the weather, the event, or the commercial deal that is associated with the at least one of the points of interests.

4. The system of claim 1, wherein the server is further configured to perform:

receiving, from the media playback device, a selection of a possible destination;

retrieving travel information to the selected destination including at least one of an airport or flight;

providing the retrieved travel information to the media playback device.

5. The system of claim 4, wherein the server is further configured to provide the travel information to the selected destination based on a current itinerary of the passenger.

6. The system of claim 1, wherein the additional server is configured to obtain the personal information of the passengers and the location-related information.

7. The system of claim 6, wherein the additional server is not located within the commercial passenger vehicle and is a fixed location server and services more than one commercial passenger vehicle.

8. The system of claim 7, wherein the additional server is configured to receive the list of the one or more preferred selectable map features from another server and update the list of the one or more preferred selectable map features.

9. The system of claim 1, wherein the media playback device is a mobile device that belongs to the at least one passenger.

10. The system of claim 1, wherein the media playback device is located behind a headrest of a seat in the commercial passenger vehicle.

11. The system of claim 1, wherein the server is further configured to update a map preference for the passenger and use the updated map preference to send the list of one or more preferred selectable map features that is more tailored to the passenger.

12. A method implemented by a server on a commercial passenger vehicle, comprising:

sending, by the server, to a media playback device associated with a passenger located in the commercial passenger vehicle, a list of selectable map features including a first map feature associated or a second map feature that are tailored to the passenger, wherein, upon a selection of a corresponding map feature by the passenger, at least one of the location-related information or the personal information of the passenger is to be represented with corresponding visualizations in the map to be provided to the media playback device on a first screen that is provided to the passenger before a second screen displaying the map, wherein the first map feature is associated with passenger information of a passenger and the second map feature is associated location-related information and the list of one or more preferred selectable map features is configured to allow the passenger to determine whether the map is to be displayed on the second screen based on the first map feature or the second map feature;

receiving, from the media playback device, a selection of one of the selectable map features to be displayed on the map;

receiving map data based on a predetermined setting;

integrating, to the received map data, the personal information of the passenger or the location-related information that is related to the selection of one of the selectable map features; and rendering the map to include visualized items corresponding to the personal information or the location-related information, wherein a rendered map is provided to displayed on the second screen of the media playback device associated with the passenger only among passengers in the commercial passenger vehicle, and wherein the first map feature associated with passenger information includes at least one of a travel history of the passenger, a purchase trend of the passenger, a profile of the passenger, a preferred map setting, or preselected points of interests and the second map feature associated with location-related information includes points of interests near a travel path of the commercial passenger vehicle or points of interests of an area selected by the passenger, and wherein the method further comprises: receiving the list of one or more preferred selectable map features from an additional server that stores a previously updated list of one or more preferred selectable map feature that has been updated based on the passenger's selection during a previous travel.

13. The method of claim 12, wherein the location-related information includes at least one of weather, an event, or a commercial deal that is associated with at least one of the location-based information.

14. The method of claim 12, further comprising updating the list of the selectable map feature based on the selection received from the media playback device.

15. The method of claim 12, further comprising, after the rendering the map:
   receiving, from the media playback device, a selection of a possible destination;
   retrieving travel information to the selected destination including at least one of an airport or flight; and
   providing the retrieved travel information to the media playback device.

16. The method of claim 15, wherein the travel information to the selected destination is provided to suggest a possible interruption to a current itinerary of the passenger.

17. The method of claim 12, wherein the media playback device is a mobile device that belongs to the at least one passenger.

18. The method of claim 12, wherein the media playback device is located behind a headrest of a seat in the commercial passenger vehicle.

19. The method of claim 12, wherein the sending the list of selectable map features includes updating a map preference for the passenger and using updated map preference to send the list of selectable map features.

\* \* \* \* \*